United States Patent
Baughman et al.

(10) Patent No.: US 10,527,433 B2
(45) Date of Patent: Jan. 7, 2020

(54) AUTOMATED VEHICLE PARKING SPACE RECOMMENDATION

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US); Patrick R. Mardones Rodriguez, Recoleta (CL)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 15/425,170

(22) Filed: Feb. 6, 2017

(65) Prior Publication Data

US 2018/0225969 A1    Aug. 9, 2018

(51) Int. Cl.
| | |
|---|---|
| G01C 21/28 | (2006.01) |
| G06Q 10/06 | (2012.01) |
| G06Q 10/10 | (2012.01) |
| G08G 1/14 | (2006.01) |
| H04L 29/08 | (2006.01) |

(52) U.S. Cl.
CPC ......... *G01C 21/28* (2013.01); *G06Q 10/0631* (2013.01); *G06Q 10/101* (2013.01); *G08G 1/148* (2013.01); *H04L 67/12* (2013.01)

(58) Field of Classification Search
CPC .... G01C 21/28; H04L 67/12; G06Q 10/0631; G06Q 10/101; G08G 1/148
See application file for complete search history.

(56) References Cited

U.S. PATENT DOCUMENTS

| | | | |
|---|---|---|---|
| 7,516,010 B1 | 4/2009 | Kaplan et al. | |
| 10,115,306 B2 * | 10/2018 | Agrawal | G08G 1/14 |
| 2005/0280555 A1 | 12/2005 | Warner | |

(Continued)

FOREIGN PATENT DOCUMENTS

| | | |
|---|---|---|
| WO | WO2010064178 A1 | 6/2010 |
| WO | WO2012092276 A2 | 7/2012 |
| WO | WO2014117016 A1 | 7/2014 |

OTHER PUBLICATIONS

Koster et al., "Recognition and Recommendation of Parking Places", Lecture Notes in Computer Science vol. 8864—Advances in Artificial Intelligence (IBERAMIA 2014), Nov. 2014, pp. 675-685.

(Continued)

*Primary Examiner* — Sze-Hon Kong
(74) *Attorney, Agent, or Firm* — Yee & Associates, P.C.

(57) ABSTRACT

Recommending a parking space to a target vehicle is provided. Current crowdsourced data corresponding to a plurality of vehicles geographically located at a plurality of parking facilities in geographic proximity to an intermediary parking destination of the target vehicle for travel mode change between a starting location and a final destination during a multi-modal commute is received. A parking space recommendation is generated for the target vehicle at the intermediary parking destination based on parking space availability information that includes the current crowdsourced data corresponding to the plurality of vehicles geographically located at the plurality of parking facilities. The parking space recommendation is transmitted to a mobile device of a user corresponding to the target vehicle.

20 Claims, 9 Drawing Sheets

(56) References Cited

U.S. PATENT DOCUMENTS

| | | | |
|---|---|---|---|
| 2006/0184314 A1 | 8/2006 | Couckuyt et al. | |
| 2007/0239348 A1 | 10/2007 | Cheung | |
| 2010/0328104 A1 | 12/2010 | Groft | |
| 2012/0004841 A1 | 1/2012 | Schunder | |
| 2012/0323643 A1* | 12/2012 | Volz | G07B 15/02 705/13 |
| 2013/0290045 A1* | 10/2013 | Levy | G07B 15/02 705/5 |
| 2014/0249742 A1* | 9/2014 | Krivacic | G06Q 10/02 701/400 |
| 2014/0266800 A1* | 9/2014 | Koukoumidis | G08G 1/141 340/932.2 |
| 2014/0313058 A1* | 10/2014 | Chen | G08G 1/141 340/932.2 |
| 2015/0051833 A1 | 2/2015 | Geelen | |
| 2015/0310745 A1 | 10/2015 | Osment | |
| 2016/0104378 A1* | 4/2016 | Narayanan | G08G 1/146 701/1 |
| 2016/0140845 A1* | 5/2016 | Agrawal | G08G 1/14 340/932.2 |
| 2016/0148513 A1 | 5/2016 | Beaurepaire | |
| 2016/0334235 A1* | 11/2016 | Gustafson | G01C 21/3423 |
| 2016/0358477 A1* | 12/2016 | Ansari | G08G 1/167 |
| 2017/0118307 A1* | 4/2017 | Beaurepaire | G01C 21/3685 |
| 2017/0124378 A1* | 5/2017 | High | G08G 1/14 |
| 2017/0132541 A1* | 5/2017 | Myers | G06Q 10/06311 |
| 2017/0148324 A1* | 5/2017 | High | G06K 9/00771 |
| 2017/0154530 A1* | 6/2017 | Irion | G01C 21/3685 |
| 2017/0191849 A1* | 7/2017 | Agam | G01C 21/3685 |
| 2017/0206473 A1* | 7/2017 | Dermosessian | G06Q 10/02 |
| 2017/0229017 A1* | 8/2017 | Bartsch | G08G 1/144 |
| 2017/0229018 A1* | 8/2017 | Levy | G08G 1/096811 |
| 2017/0243488 A1* | 8/2017 | Meijer | G08G 1/0112 |
| 2018/0037193 A1* | 2/2018 | Penilla | H04N 7/181 |
| 2018/0047288 A1* | 2/2018 | Cordell | B60Q 9/008 |
| 2018/0053417 A1* | 2/2018 | Rolf | G08G 1/143 |
| 2018/0089631 A1* | 3/2018 | Baker, Sr. | G06Q 10/1093 |
| 2018/0099661 A1* | 4/2018 | Bae | B60R 1/00 |
| 2018/0150773 A1* | 5/2018 | Lee | G08G 1/143 |
| 2018/0164830 A1* | 6/2018 | Moosaei | B60W 30/06 |
| 2018/0197413 A1* | 7/2018 | Stefan | G08G 1/015 |
| 2018/0215374 A1* | 8/2018 | Lee | B60W 30/06 |
| 2018/0218605 A1* | 8/2018 | Mowatt | G08G 1/144 |

OTHER PUBLICATIONS

Trebilcox-Ruiz, "How to Recognize User Activity With Activity Recognition", Envato Pty Ltd., Feb. 3, 2016, 11 pages. https://code.tutsplus.com/tutorials/how-to-recognize-user-activity-with-activity-recognition--cms-25851.

* cited by examiner

AUTOMATED VEHICLE PARKING SPACE RECOMMENDATION

BACKGROUND

1. Field

The disclosure relates generally to automated travel planning and more specifically to automatically generating a set of parking space options for a vehicle corresponding to a user based on a final travel destination of the user and a user-desired time of arrival at the final destination during a multi-modal commute.

2. Description of the Related Art

In commuting scenarios, many factors may affect travel time and travel experience including heavy traffic patterns, weather-related delays, availability of parking spaces along the travel route, and availability of alternative transportation options (e.g., public transportation, such as bus, train, subway, and the like). Many people have experienced trying to get to an event's parking only to find that the last half mile of driving takes longer than the entire trip to the event.

Methods to calculate parking space availability currently exist. For example, placing sensors at individual parking spaces or using image capturing devices, such as a video camera system, to visually inspect an entire parking lot. However, these current methods require outfitting of parking lots with specialized equipment to capture the vehicle usage information.

SUMMARY

According to one illustrative embodiment, a computer-implemented method for recommending a parking space to a target vehicle is provided. A computer receives current crowdsourced data corresponding to a plurality of vehicles geographically located at a plurality of parking facilities in geographic proximity to an intermediary parking destination of the target vehicle for travel mode change between a starting location and a final destination during a multi-modal commute. The computer generates a parking space recommendation for the target vehicle at the intermediary parking destination based on parking space availability information that includes the current crowdsourced data corresponding to the plurality of vehicles geographically located at the plurality of parking facilities. The computer transmits the parking space recommendation to a mobile device of a user corresponding to the target vehicle. According to other illustrative embodiments, a computer system and computer program product for recommending a parking space to a target vehicle are provided.

DETAILED DESCRIPTION

Figure 1:
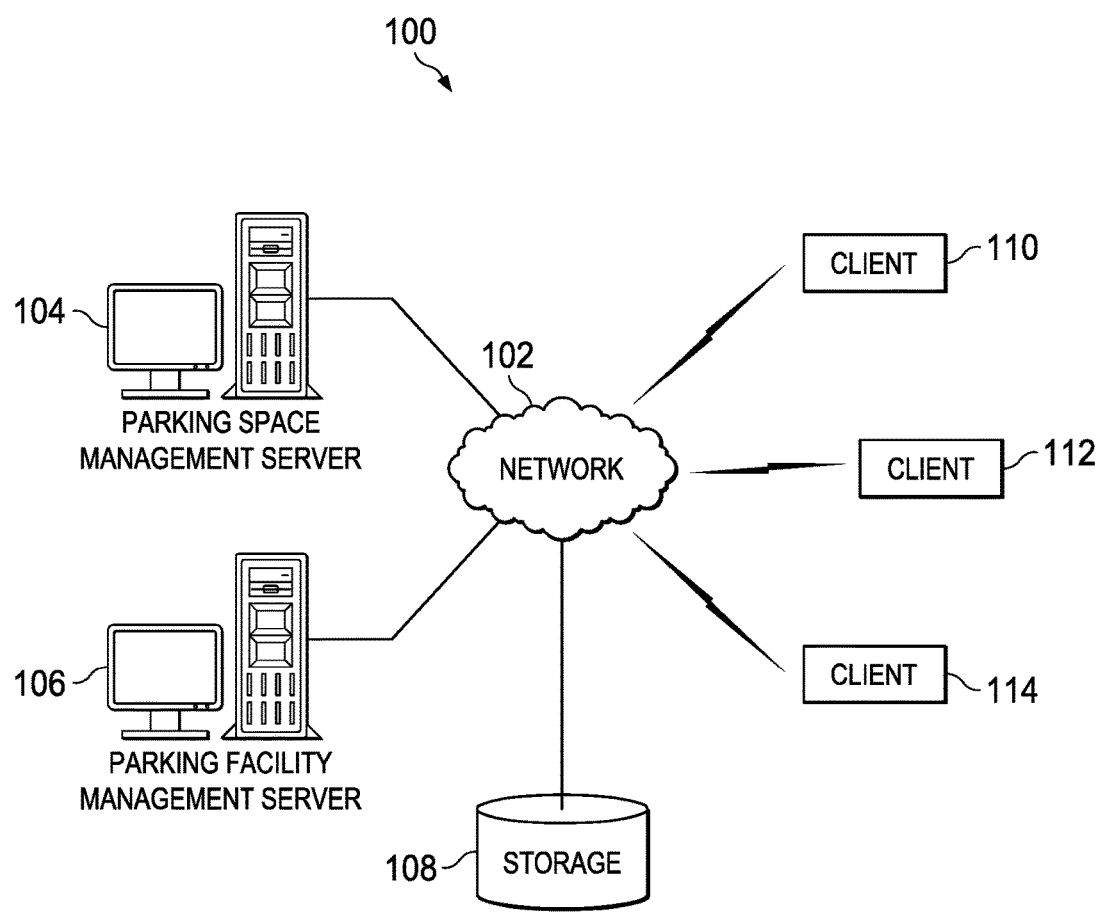
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
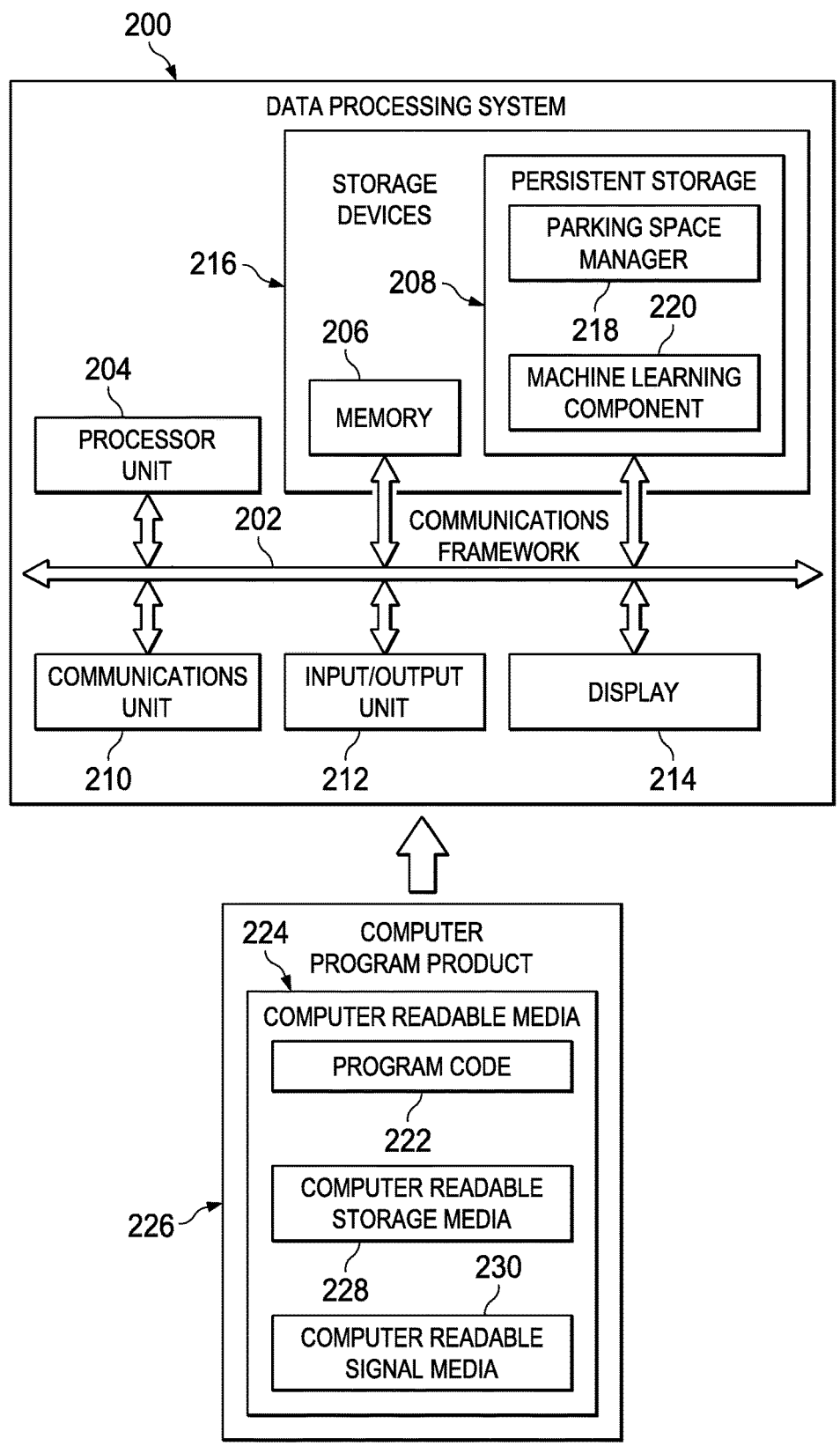
FIG. 2 is a diagram of a data processing system in which illustrative embodiments may be implemented.
Figure 3:
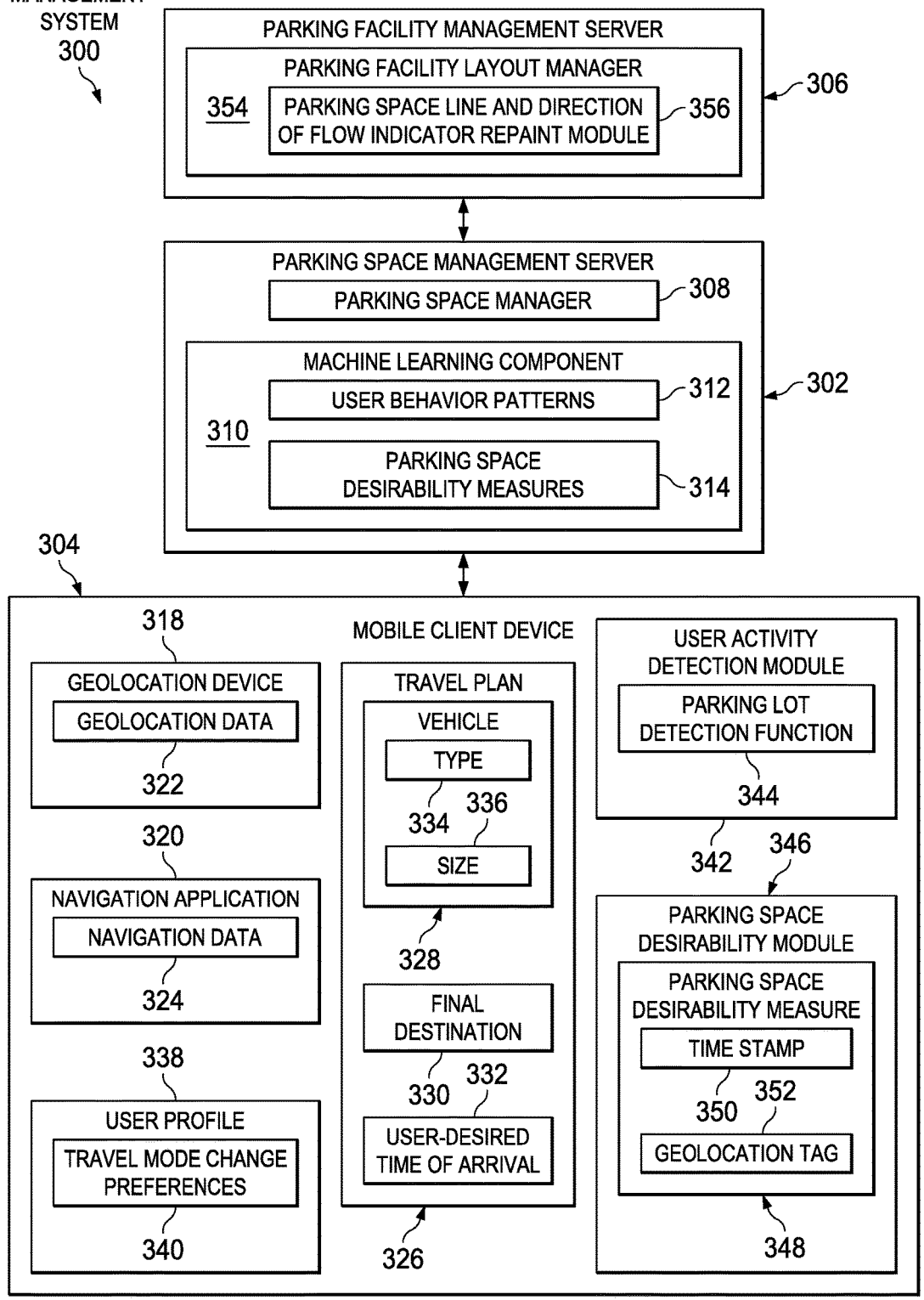
FIG. 3 is a diagram illustrating an example of a parking space management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile data processing systems, and other devices in which the illustrative embodiments may be implemented. Network data processing system 100 contains network 102, which is the medium used to provide communications links between the computers, mobile data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In this example, server 104 is a parking space management server and server 106 is a parking facility management server. Also, it should be noted that parking space management server 104 and parking facility management server 106 may each represent a plurality of different servers providing parking space and parking facility management services.

For example, parking space management server 104 automatically determines available parking spaces within parking facilities for a vehicle corresponding to a user based on a final travel destination of the user and a user-desired time of arrival at the final destination during a multi-modal commute to the user's final destination. Parking space management server 104 determines the available parking space options for the vehicle user based on received crowdsourced navigation application data from a plurality of mobile client devices corresponding to a plurality of different users in areas surrounding the parking facilities along a travel route to user's final destination.

Parking facility management server 106 is located within or near a set of one or more parking facilities that parking facility management server 106 manages. Parking facility management server 106 manages the set of parking facilities by altering parking space orientation and/or size within the parking facilities and by altering vehicle and pedestrian traffic direction of flow in to and out of the parking facilities. Parking space management server 104 may direct parking facility management server 106 to make the parking facility alterations based on parking space management server 104 receiving the crowdsourced navigation application data from the plurality of mobile client devices corresponding to the plurality of different users surrounding the parking facilities. In other words, parking space management server 104 is capable of predicting the number, type, and size of vehicles arriving at the different parking facilities based on aggregating the collected data from the plurality of mobile client devices and sending that information and instructions to parking facility management server 106.

Client 110, client 112, and client 114 also connect to network 102. Clients 110, 112, and 114 represent a plurality of mobile client devices that are connected to parking space management server 104 via network 102. Further, parking space management server 104 may provide information, such as software applications, programs, and updates to clients 110, 112, and 114.

Clients 110, 112, and 114 may be, for example, smart vehicles, smart phones, cellular phones, handheld computers, smart watches, personal digital assistants, portable gaming devices, user wearables such as user exercise/activity monitors worn by users, and the like, which are equipped with wireless communication and geolocation aware technology. The geolocation aware technology may be, for example, global positioning system (GPS) technology or other type of technology capable of determining and transmitting a current geographic location of clients 110, 112, and 114. Users of clients 110, 112, and 114 may utilize clients 110, 112, and 114 to access the services provided by parking space management server 104.

Storage 108 is a network storage device capable of storing any type of data in a structured format or an unstructured format. In addition, storage 108 may represent a set of one or more network storage devices. Storage 108 may store, for example, names and identifiers for a plurality of different client device users; profiles for each of the different client device users; identifiers for each of the plurality of different client devices corresponding to the plurality of users, parking facility layouts, parking space desirability measures, user travel behavior patterns, and the like. Further, storage 108 may store other data, such as authentication or credential data that may include user names, passwords, and biometric data associated with the client device users and system administrators, for example.

In addition, it should be noted that network data processing system 100 may include any number of additional server computers, client data processing devices, and other devices not shown. Program code located in network data processing system 100 may be stored on a computer readable storage medium and downloaded to a computer or data processing system for use. For example, program code may be stored on a computer readable storage medium on parking space management server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as parking space management server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores parking space manager 218 and machine learning component 220. Parking space manager 218 automatically generates a set of one or more parking options for a vehicle corresponding to a user of a mobile client device during a multi-modal commute based on final destination of the user, desired time of arrival at the final destination, and crowdsourced geolocation and navigation data received from a plurality of other mobile client devices corresponding to other users along the route of the multi-modal commute of the user. It should be noted that even though parking space manager 218 is illustrated as residing in persistent storage 208, in an alternative illustrative embodiment parking space manager 218 may be a separate component of data processing system 200. For example, parking space manager 218 may be a hardware component coupled to communication fabric 202 or a combination of hardware and software components.

Machine learning component 220 represents artificial intelligence cognitive learning software capable of detecting patterns in data over time and drawing inferences from the detected patterns using statistical analysis and predictive analytics without being explicitly programmed to do so. Parking space manager 218 utilizes machine learning component 220 to detect user behavior patterns in the crowdsourced geolocation and navigation data received from the plurality of mobile client devices and to predict parking space availability in various parking facilities to allow a user to arrive at a final destination at the user-desired time during a multi-modal commute.

Communications unit 210, in this example, provides for communication with other computers, data processing systems, and mobile client devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 222 is located in a functional form on computer readable media 224 that is selectively removable and may be loaded onto or transferred to data processing system 200 for running by processor unit 204. Program code 222 and computer readable media 224 form computer program product 226. In one example, computer readable media 224 may be computer readable storage media 228 or computer readable signal media 230. Computer readable storage media 228 may include, for example, an optical or magnetic disc that is inserted or placed into a drive or other device that is part of persistent storage 208 for transfer onto a storage device, such as a hard drive, that is part of persistent storage 208. Computer readable storage media 228 also may take the form of a persistent storage, such as a hard drive, a thumb drive, or a flash memory that is connected to data processing system 200. In some instances, computer readable storage media 228 may not be removable from data processing system 200.

Alternatively, program code 222 may be transferred to data processing system 200 using computer readable signal media 230. Computer readable signal media 230 may be, for example, a propagated data signal containing program code 222. For example, computer readable signal media 230 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 222 may be downloaded over a network to persistent storage 208 from another device or data processing system through computer readable signal media 230 for use within data processing system 200. For instance, program code stored in a computer readable storage media in a data processing system may be downloaded over a network from the data processing system to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 228 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments utilize a cognitive machine learning component for determining the most expedient commuter approach leveraging crowdsourced navigation data from a plurality of user mobile devices, which are location aware, and user-desired time of arrival at a final travel destination of the user based on the user's travel preferences. Further, illustrative embodiments may change the orientation and direction of parking space lines within a parking facility using parking space line light projections or renderings. For example, in response to illustrative embodiments determining that an increased number of vehicle with decreased dimensions, such as, for example, motorcycles, are arriving at a particular parking facility, illustrative embodiments may resize a number of parking spaces by decreasing a distance between parking space lines for the number of parking spaces to accommodate the vehicles with decreased dimensions. By resizing parking spaces to accommodate the smaller dimension vehicles, illustrative embodiments may increase a total number of parking spaces within the parking facility. In addition to, or instead of, using light projections to resize the parking spaces, illustrative embodiments may utilize movable or adjustable parking space barriers.

Further, illustrative embodiments may change traffic flow patterns of vehicles out of a parking facility by altering traffic flow indicators, such as direction arrows, to direct vehicles to low traffic density streets. Furthermore, illustrative embodiments may change pedestrian traffic flow patterns within a parking facility to decrease congestion and increase safety. Illustrative embodiments determine the availability of unoccupied parking spaces in a parking facility to calculate the best travel route in a multi-modal commute involving a combination of driving, parking, walking, and various forms of other transportation (e.g., public transportation). A parking facility may include, for example, public parking lots, private parking lots, open access parking lots, restricted access parking lots, parking lots that have free parking, parking lots that have paid parking, event parking lots, such as, for example, sport and entertainment venue parking lots, shopping area parking lots, such as, for example, mall and strip mall parking lots, small business parking lots, large corporation parking lots, parking garages, on-street parking, or any other place where vehicles may park.

Illustrative embodiments determine the most effective combination of modes of transportation for a user who wants to arrive at a final travel destination at a particular time (e.g., before the start of a business meeting with clients at the corporate office downtown). For example, illustrative embodiments may indicate to a user that it may be faster for the user to park at a parking facility farther away from the user's final travel destination and then walk the last mile, as opposed to, the user driving to a parking facility closer to the user's final travel destination, which may require a longer amount of time to get to because of traffic congestion, only to circle the parking facility one or more times trying to locate an unoccupied parking space.

Moreover, illustrative embodiments neither utilize imaging equipment, such as cameras, nor designated parking spots to manage vehicle parking. Illustrative embodiments intuitively determine current parking space availability at a parking facility based on analyzing real time behavior of other users geographically located at or in close proximity to the parking facility. Thus, illustrative embodiments are able to provide a user with valuable information as to where and how to efficiently park a vehicle in a private-to-public mode of transportation transition scenario.

Illustrative embodiments calculate relative availability of unoccupied parking spaces in a parking facility by aggregate detection of user behaviors, which illustrative embodiments collect from a plurality of client mobile devices, which are geolocation aware. Mobile devices may include, for example, smart vehicles, smart phones, cellular phones, handheld computers, smart watches, personal digital assistants, handheld gaming devices, and user wearables, such as exercise or activity monitors, smart glasses, virtual reality headsets, and the like. Additionally, illustrative embodiments determine, in the aggregate, the relative desirability of available unoccupied parking spaces by automatically receiving parking space desirability measures from client mobile devices of users who parked their respective vehicles in particular parking spaces recommended by illustrative embodiments. Specifically, illustrative embodiments may calculate the desirability of a parking space for a particular user based on several metrics.

One metric may be the repainting of parking space lines and direction of movement guides by illustrative embodiments using a divide and conquer optimization strategy. A second metric may be user walking distance. For example, the distance a user travels by foot from a parking space to an entrance of a train station is inversely proportional to the availability of unoccupied parking spaces (i.e., decreased user foot travel equals increased unoccupied parking space availability). A third metric may be number of parking facility orbits. For example, the number of orbits by a user's vehicle around a parking facility before finding an unoccupied parking space also is inversely proportional to the availability of unoccupied parking spaces (i.e., decreased number of vehicle orbits around a parking facility equals increased unoccupied parking space availability).

A fourth metric may be parking facility drive time. For example, the time a user spends driving within a parking facility, which is another measure of user-expended effort to find an occupied parking space, also is inversely proportional to the availability of unoccupied parking spaces (i.e., decreased user driving time in a parking facility equals increased unoccupied parking space availability). A fifth metric may be parked vehicle time. For example, the average amount of time vehicles remain parked in a parking facility (e.g., a daily commuter parking facility where vehicles may remain parked in a space for 8 to 10 hours straight, as opposed to, a shopping mall parking facility where vehicles on average may park in a space for only 30 minutes to an hour).

A sixth metric may be parking facility capacity. For example, the time factorization where parking lot capacity depends on time of day. For example, by analyzing available data collected from a plurality of user mobile devices, illustrative embodiments may determine which parking facility provides the best availability of unoccupied parking spaces based on time of day. For example, some parking facilities may provide the best availability of unoccupied parking spaces for a 6:00 a.m. commute to work in the city, while other parking facilities may provide the best parking availability for an 8:00 p.m. hockey game during a week night in the city's downtown district.

A seventh metric may be user safety. For example, geographic location of a parking facility may raise security concerns for a user. Illustrative embodiments may calculate a location security score for a parking facility based on data corresponding to that parking facility and surrounding area. Illustrative embodiments may derive this location security score for a parking facility based on factors such as: 1) crime rate at a parking facility; 2) description of the parking facility, such as a rural park-n-ride parking lot near a highway or a ten story parking garage downtown; 3) crime rate of the area surrounding a parking facility; 4) description of the surrounding area, such as rural, suburban, city, and the like; and 5) security features of a parking facility, such as presence of a full time attendant, security camera, amount of lighting, and the like.

Based on the metrics above, illustrative embodiments may direct a driver of a vehicle to one of a plurality of parking facilities in an area using real time data collected from a plurality of mobile devices corresponding to a plurality of different users and short-term parking availability predictions. As a result, illustrative embodiments are able to calculate parking space availability by analyzing behavior patterns of the plurality of different users without having to rely on specialized sensors in parking facilities or vehicles.

With reference now to FIG. 3, a diagram illustrating an example of a parking space management system is depicted in accordance with an illustrative embodiment. Parking space management system 300 is a system of software and hardware components for automatically determining parking space options for a vehicle corresponding to a user based on a final travel destination of the user and a user-desired time of arrival at the final destination during a multi-modal commute and automatically modifying a layout of parking spaces within a parking facility based on predictions of number, type, and size of vehicles arriving at a parking facility. Parking space management system 300 may be implemented in a network of data processing systems, such as network data processing system 100 in FIG. 1.

In this example, parking space management system 300 includes parking space management server 302, mobile client device 304, and parking facility management server 306. However, it should be noted that parking space management system 300 is only meant as an example and not as a limitation on illustrative embodiments. In other words, parking space management system 300 may include any number of server computers, mobile client devices, and other devices not shown.

Parking space management server 302 may be, for example, parking space management server 104 in FIG. 1 or data processing system 200 in FIG. 2. In this example, parking space management server 302 includes parking space manager 308 and machine learning component 310, such as parking space manager 218 and machine learning component 220 in FIG. 2. Parking space management server 302 utilizes parking space manager 308 to generate parking options for vehicles corresponding to users during multi-modal commutes based on crowdsourced geolocation and navigation data received from a plurality of mobile devices corresponding to the users. Parking space management server 302 utilizes machine learning component 310 to detect and learn user behavior patterns 312 in the crowdsourced geolocation and navigation data received from the plurality of mobile devices. Further, parking space management server 302 utilizes machine learning component 310 to generate a statistical prediction or assertion of relative fullness of a given parking facility based on an aggregate of parking space desirability measurements 314 received from the plurality of mobile devices, such as mobile client device 304.

Mobile client device 304 may be, for example, client 110 in FIG. 1. Mobile client device 304 includes geolocation device 318 and navigation application 320. Geolocation device 318 may be, for example, a GPS transceiver. Geolocation device 318 generates geolocation data 322. Geolocation data 322 identifies the current geographic location of mobile client device 304. Navigation application 320 generates navigation data 324, which also may include geolocation data. Navigation data 324 may include, for example, a proposed travel route of a user to a travel destination. Mobile client device 304 transmits geolocation data 322 and/or navigation data 324 to parking space management server 302. Mobile client device 304 may transmit geolocation data 322 and/or navigation data 324 to parking space management server 302 on, for example, a continuous basis, on a predetermined time interval basis, or on demand.

A user of mobile client device 304 inputs travel plan 326. Travel plan 326 represents the user's current plan of travel. In this example, travel plan 326 includes vehicle 328, final destination 330, and user-desired time of arrival 332. Vehicle 328 identifies a vehicle that the user intends to use during a multi-modal commute. Vehicle 328 includes type 334 and size 336. Type 334 identifies a type of vehicle 328, such as a motorcycle, a car, a van, an extended cab pickup truck, or the like. Size 336 identifies relative dimensions of vehicle 328, such as width, length, and height.

Final destination 330 identifies the user's final travel destination of the multi-modal commute. However, it should be noted that final destination 330 may not necessarily be input by the user. For example, mobile client device 304 may infer final destination 330 from historical data about the user's previous travel behavior or may extract final destination 330 from an electronic calendar or daily planner of the user on mobile client device 304. If mobile client device 304 knows the user's routines or the user has saved appointment locations in the user's electronic calendar or organizer, then mobile client device 304 may send this information to parking space management server 302 so that parking space management server 302 can predict when and where the user will search for a parking space. Parking space management server 302 can estimate how many free spaces will be available for an area, given a time and date. User-desired time of arrival 332 identifies when the user wants to arrive at final destination 330.

User profile 338 corresponds to the user of mobile client device 304. User profile 338 includes travel mode change preferences 340. Travel mode change preferences 340 identify types of transportation the user prefers, such as bus, subway, train, airplane, and the like, after parking vehicle 328 at a parking facility during the multi-mode commute. Travel mode change preferences 340 also may identify preferences of transportation during, for example, inclement weather, heavy traffic congestion, and the like. User profile 338 also may include other information, such as, for example, the user's name, residence address, work address, owned vehicles, hobbies, activities, and the like. Mobile client device 304 also transmits travel plan 326 and travel mode change preferences 340 to parking space management server 302.

Mobile client device 304 utilizes user activity detection module 342 to determine the activity of the user, such as when the user is, for example, walking, running, in a vehicle, remaining still, and the like. User activity detection module 342 includes parking lot detection function 344, which detects when the user transitions from "in vehicle" to "walking" within a parking facility.

In response to receiving a notification from parking lot detection function 344 that the user has exited the vehicle within a parking facility, parking space desirability module 346 calculates parking space desirability measure 348 corresponding to the parking space the vehicle is currently parked in. Parking space desirability module 346 calculates parking space desirability measure 348 of the parking space based on transitions from high-speed driving, to low speed-driving, to walking, to no movement (e.g., arrived at final destination 330). Parking space desirability module 346 transmits parking space desirability measure 348, which includes time stamp 350 and geolocation tag 352, to parking space management server 302. Time stamp 350 identifies the time the vehicle parked in the current parking space. Geolocation tag 352 identifies the exact geographic location of the current parking space within the parking facility.

Parking space management server 302 receives parking space desirability measures 314 from a plurality of different parking space desirability modules and performs calculations on the aggregate parking space desirability measurement data. Parking space management server 302 calculates a current unoccupied parking space availability measure based on the information and data received from the plurality of mobile client devices.

Parking facility management server 306 may be, for example, parking facility management server 106 in FIG. 1. After calculating the number, type, and size of vehicles arriving at a parking facility corresponding to parking facility management server 306, parking space management server 302 may direct parking facility management server 306 to modify or change a layout of the parking facility. Parking facility management server 306 utilizes parking facility layout manager 354 to alter parking space orientation and/or size within the parking facility and alter vehicle and pedestrian traffic direction of flow in to and out of the parking facilities based on the information received from parking space management server 302. Parking facility layout manager 354 utilizes parking space line and direction of flow indicator repaint module 356 to repaint the parking space lines and direction of flow indicators within the parking facility using, for example, projections or renderings. Alternatively, parking space line and direction of flow indicator repaint module 356 may utilize moveable parking space line barriers and rotatable direction of flow indicator signs.

Figure 4:
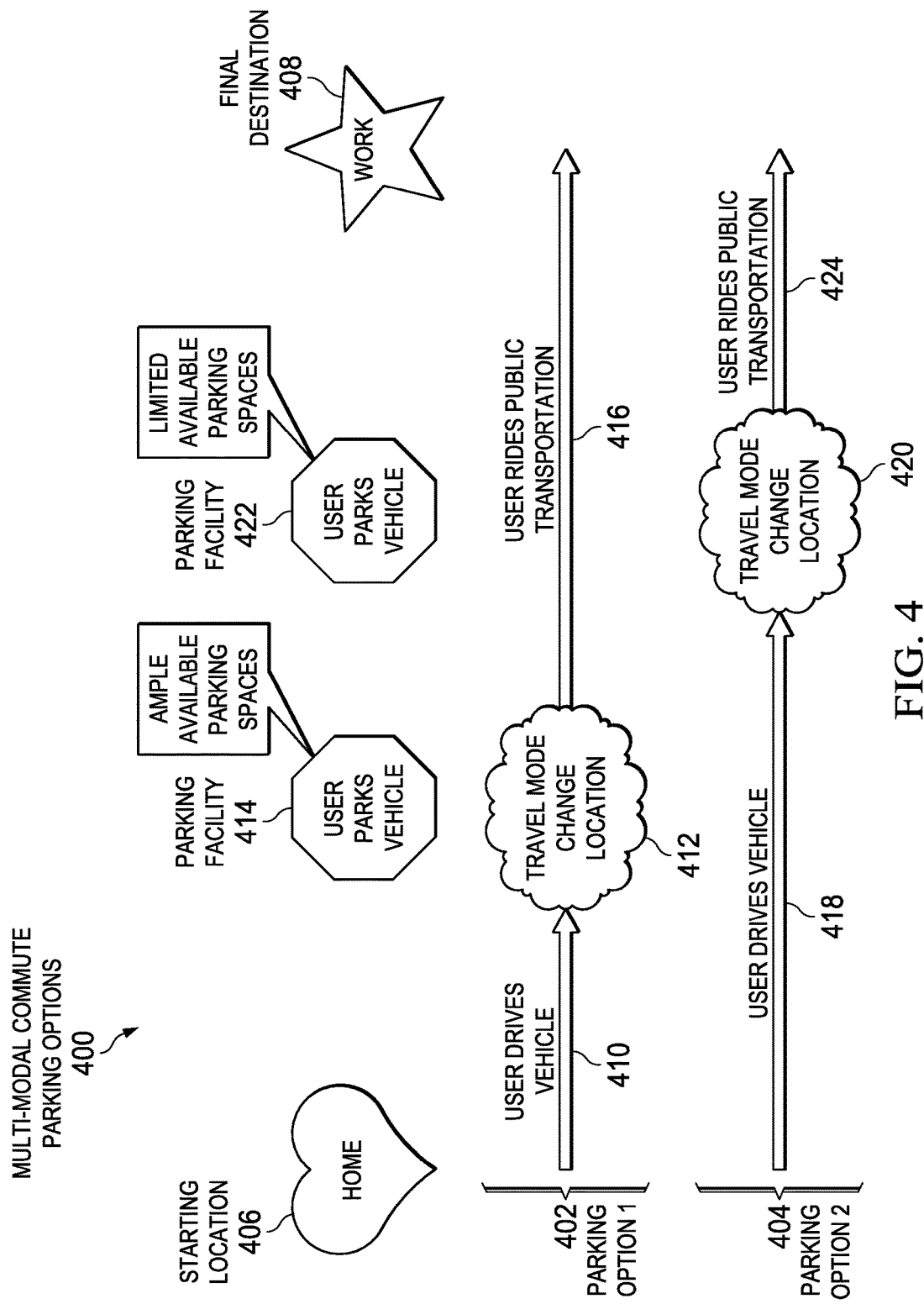
FIG. 4 is a diagram illustrating specific examples of multi-modal commute parking options in accordance with an illustrative embodiment.

With reference now to FIG. 4, a diagram illustrating specific examples of multi-modal commute parking options is depicted in accordance with an illustrative embodiment. In this example, multi-modal commute parking options 400 includes parking option 1 402 and parking option 2 404. However, it should be noted that multi-modal commute parking options 400 may include any number of parking options.

Starting location 406 represents the geographic location where the mobile device user starts the multi-mode commute from. In this example, starting location 406 is a home or residence of the user. Final destination 406 represents the geographic location where the multi-mode commute ends for the user. In this example, final destination 406 is a work or job site of the user.

Parking option 1 402 begins at 410 where the user will start to drive a vehicle from starting location 406 to travel mode change location 412 where the user will park the vehicle at parking facility 414. Illustrative embodiments predict that parking facility 414 will have ample available parking spaces upon arrival. Parking facility 414 may be, for example, a parking lot at a bus terminal. At 416, the user will ride public transportation (e.g., bus) to final destination 408. However, illustrative embodiments may determine that the public transportation corresponding to parking option 1 402 may be slower traveling, making multiple planned stops along the way before arriving at a stop where the user will exit several blocks from final destination 408.

Parking option 2 404 begins at 416 where the user will start to drive a vehicle from starting location 406 to travel mode change location 420 where the user will park the vehicle at parking facility 422. Illustrative embodiments predict that parking facility 422 will have limited available parking spaces upon arrival. Parking facility 422 may be, for example, a parking lot at a monorail station. At 424, the user will ride public transportation (e.g., monorail) to final destination 408. However, illustrative embodiments may determine that the public transportation corresponding to parking option 2 404 may be faster traveling, making one planned stop before arriving at a building corresponding to final destination 408. Even though the user may have to drive farther and use a parking facility with limited available parking spaces in parking option 2 404, illustrative embodiments may determine that parking option 2 404 is more efficient for the user during the multi-mode commute than parking option 1 402 because illustrative embodiments predict that the user will be able to arrive at final destination 408 at the user-desired time of arrival using parking option 2 404 and will not be able to arrive at final destination 408 at the user-desired time of arrival using parking option 1 402.

Figure 5:
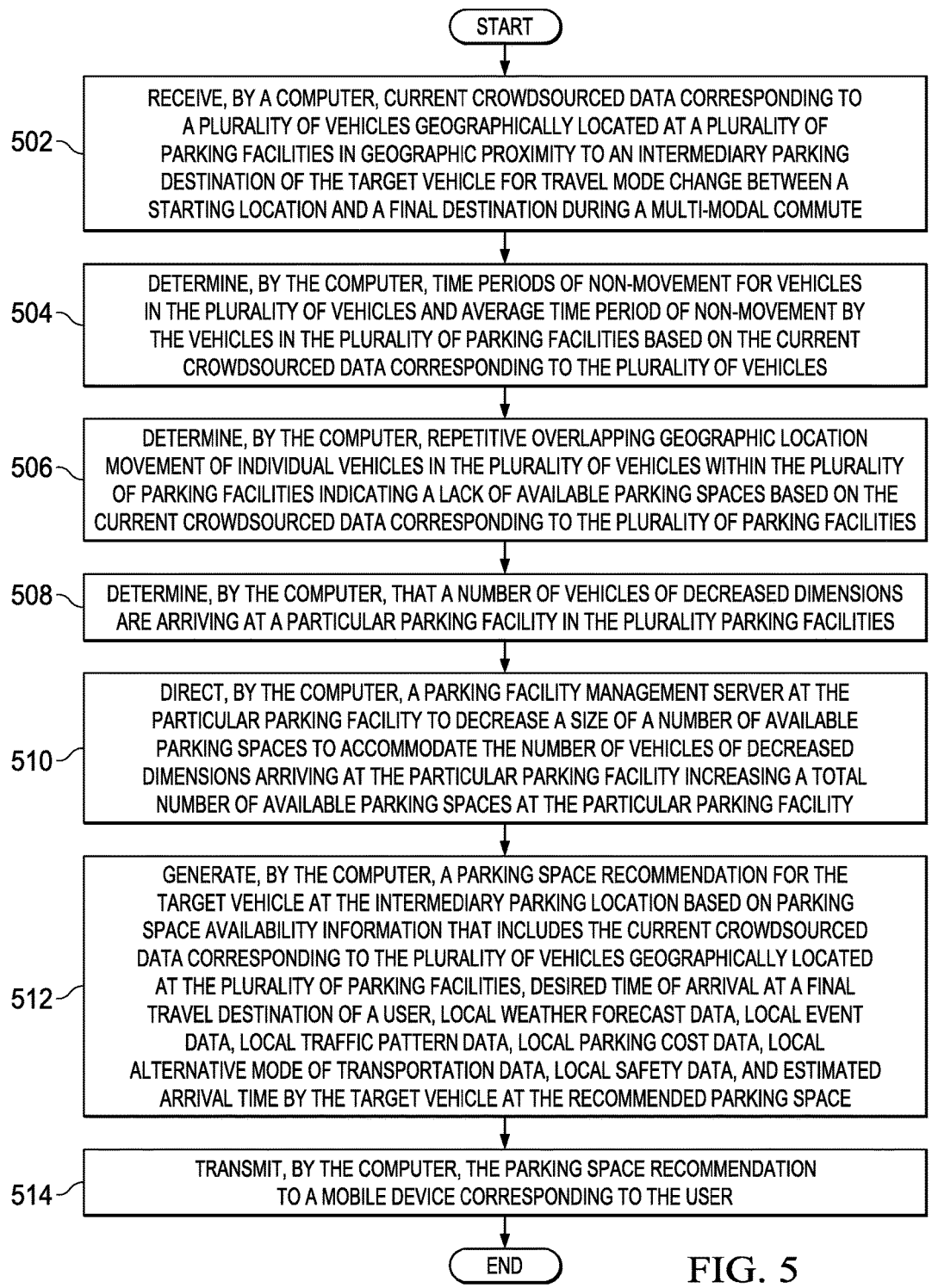
FIG. 5 is a flowchart illustrating a process for recommending a parking space for a vehicle in accordance with an illustrative embodiment.

With reference now to FIG. 5, a flowchart illustrating a process for recommending a parking space for a vehicle is shown in accordance with an illustrative embodiment. The process shown in FIG. 5 may be implemented in a computer, such as, for example, parking space management server 104 in FIG. 1, data processing system 200 in FIG. 2, or parking space management server 302 in FIG. 3.

The process begins when the computer receives current crowdsourced data corresponding to a plurality of vehicles geographically located at a plurality of parking facilities in geographic proximity to an intermediary parking destination of the target vehicle for travel mode change between a starting location and a final destination during a multi-modal commute (step 502). In addition, the computer determines time periods of non-movement for vehicles in the plurality of vehicles and average time period of non-movement by the vehicles in the plurality of parking facilities based on the current crowdsourced data corresponding to the plurality of vehicles (step 504). Further, the computer determines repetitive overlapping geographic location movement of individual vehicles in the plurality of vehicles within the plurality of parking facilities indicating a lack of available parking spaces based on the current crowdsourced data corresponding to the plurality of vehicles (step 506).

Moreover, the computer determines that a number of vehicles of decreased dimensions are arriving at a particular parking facility in the plurality of parking facilities (step 508). The computer directs a parking facility management server at the particular parking facility to decrease a size of a number of available parking spaces to accommodate the number of vehicles of decreased dimensions arriving at the particular parking facility increasing a total number of available parking spaces at the particular parking facility (step 510). The parking facility management server may be, for example, parking facility management server 106 in FIG. 1 or parking facility management server 306 in FIG. 3.

Moreover, the computer generates a parking space recommendation for the target vehicle at the intermediary parking destination based on parking space availability information that includes the current crowdsourced data corresponding to the plurality of vehicles geographically located at the plurality of parking facilities, desired time of arrival at a final travel destination of a user, local weather forecast data, local event data, local traffic pattern data, local parking cost data, local alternative mode of transportation data, local safety data, and estimated arrival time by the target vehicle at the recommended parking space (step 512). Afterward, the computer transmits the parking space recommendation to a mobile device corresponding to the user (step 514). Thereafter, the process terminates.

Figure 6A:
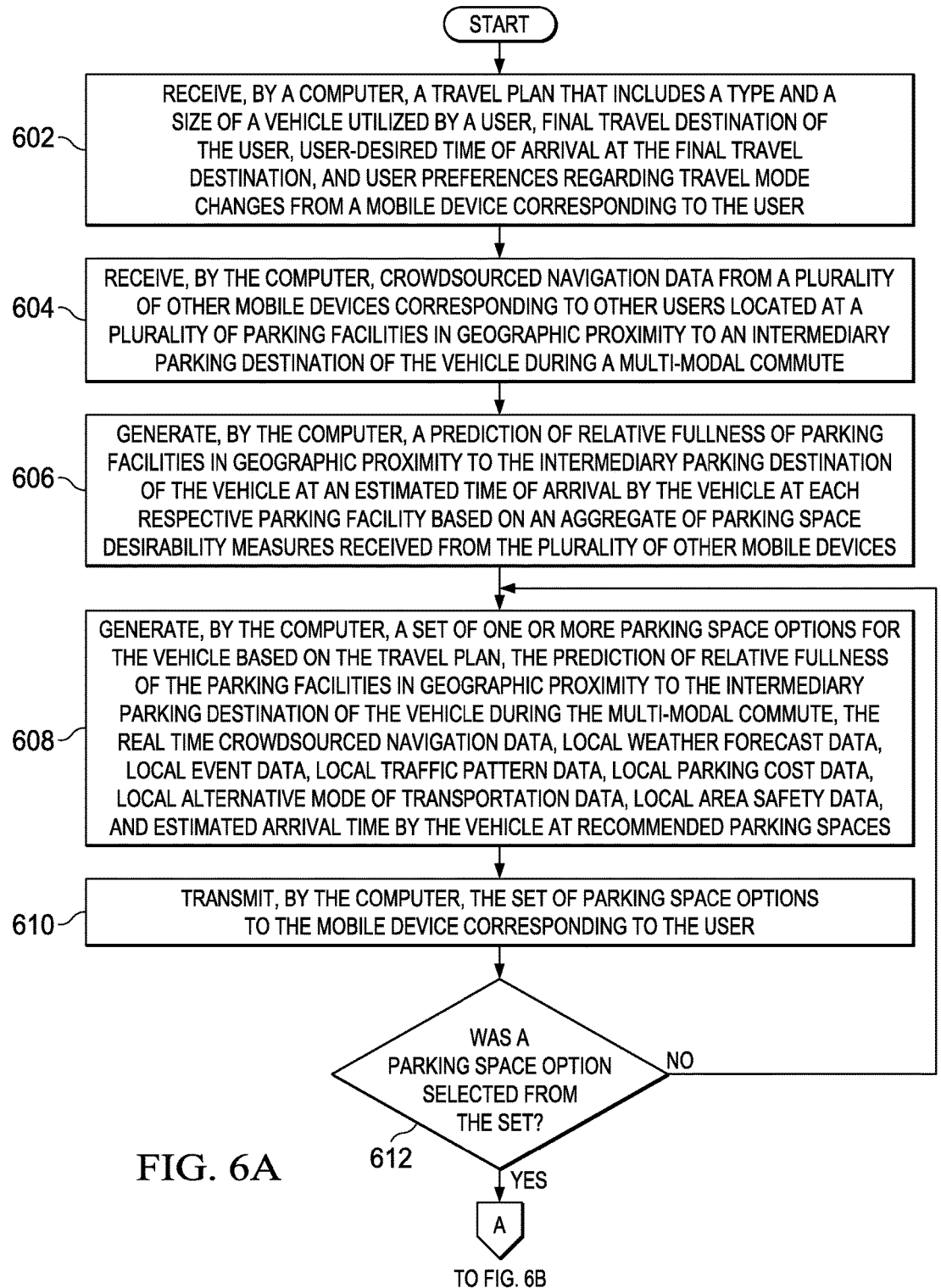
FIGS. 6A-6B are a flowchart illustrating a process for generating parking space options for a vehicle in accordance with an illustrative embodiment.
Figure 6B:
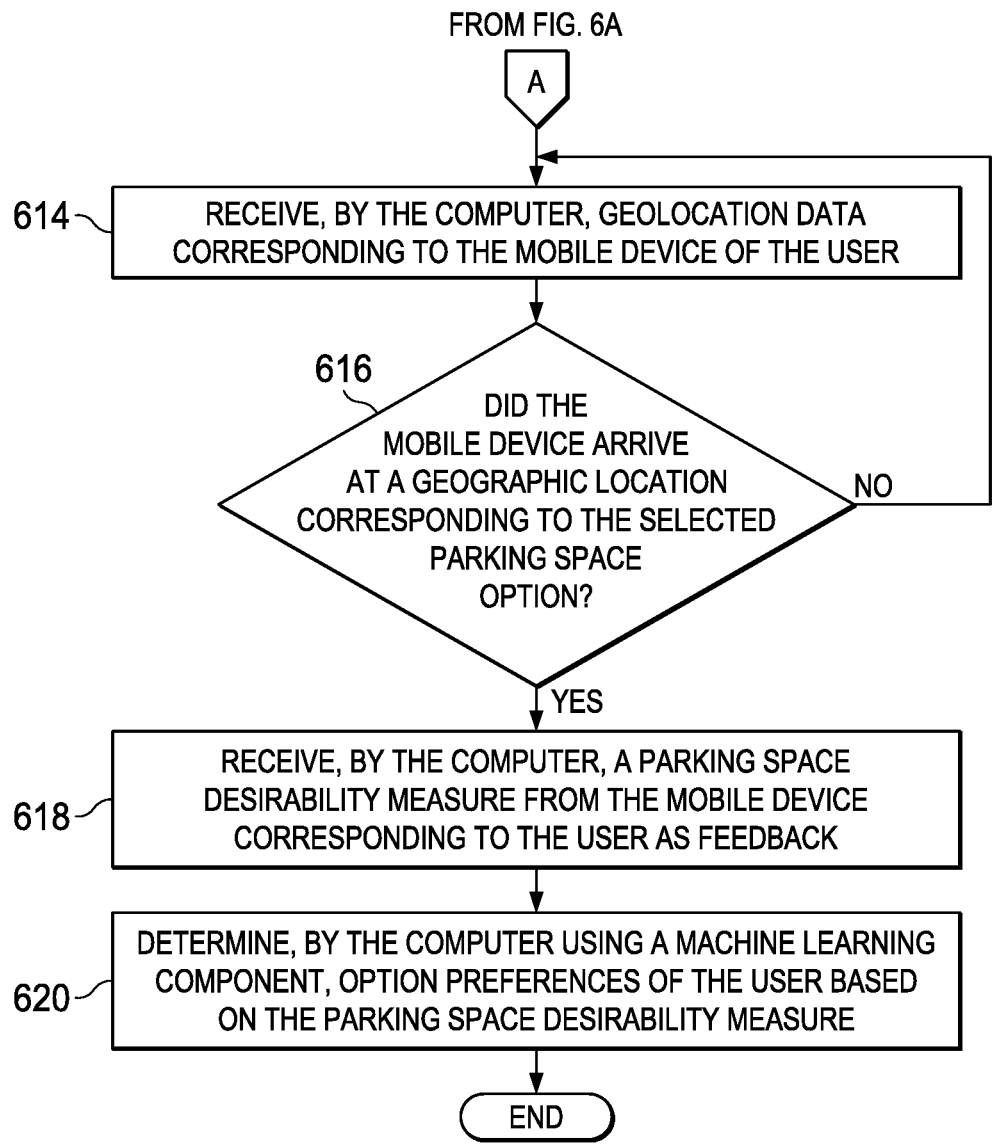

With reference now to FIGS. 6A-6B, a flowchart illustrating a process for generating parking space options for a vehicle is shown in accordance with an illustrative embodiment. The process shown in FIGS. 6A-6B may be implemented in a computer, such as, for example, parking space management server 104 in FIG. 1, data processing system 200 in FIG. 2, or parking space management server 302 in FIG. 3.

The process begins when the computer receives a travel plan that includes a type and a size of a vehicle utilized by a user, final travel destination of the user, user-desired time of arrival at the final travel destination, and user preferences regarding travel mode changes from a mobile device corresponding to the user (step 602). In addition, the computer receives real time crowdsourced navigation data from a plurality of other mobile devices corresponding to other users located at a plurality of parking facilities in geographic proximity to an intermediary parking destination of the vehicle during a multi-modal commute (step 604). Further, the computer generates a prediction of relative fullness of parking facilities in geographic proximity to the intermediary parking destination of the target vehicle at an estimated time of arrival by the vehicle at each respective parking facility based on an aggregate of parking space desirability measures received from the plurality of other mobile devices (step 606).

Afterward, the computer generates a set of one or more parking space options for the vehicle based on the travel plan, the prediction of relative fullness of the parking facilities in geographic proximity to the intermediary parking destination of the target vehicle during the multi-modal commute, the real time crowdsourced navigation data, local weather forecast data, local event data, local traffic pattern data, local parking cost data, local alternative mode of transportation data, local area safety data, and estimated arrival time by the vehicle at recommended parking spaces (step 608). The computer transmits the set of parking space options to the mobile device corresponding to the user (step 610). Then, the computer makes a determination as to whether a parking space option was selected from the set (step 612).

If the computer determines that a parking space option was not selected from the set, no output of step 612, then the process returns to step 608 where the computer generates another set of parking space options for the vehicle. If the computer determines that a parking space option was selected from the set, yes output of step 612, then the computer receives geolocation data corresponding to the mobile device of the user (step 614). In addition, the computer makes a determination as to whether the mobile device arrived at a geographic location corresponding to the selected parking space option (step 616). The computer determines whether the mobile device arrived at the geographic location of the selected parking option based on the received geolocation data corresponding to the mobile device of the user.

If the computer determines that the mobile device has not arrived at the geographic location corresponding to the selected parking space option, no output of step 616, then the process returns to step 614 where the computer continues to receive the geolocation data corresponding to the mobile device of the user. If the computer determines that the mobile device has arrived at the geographic location corresponding to the selected parking space option, yes output of step 616, then the computer receives a parking space desirability measure from the mobile device corresponding to the user as feedback (step 618). Moreover, the computer, using a machine learning component, determines option preferences of the user based on the parking space desirability measure (step 620). Thereafter, the process terminates.

Figure 7:
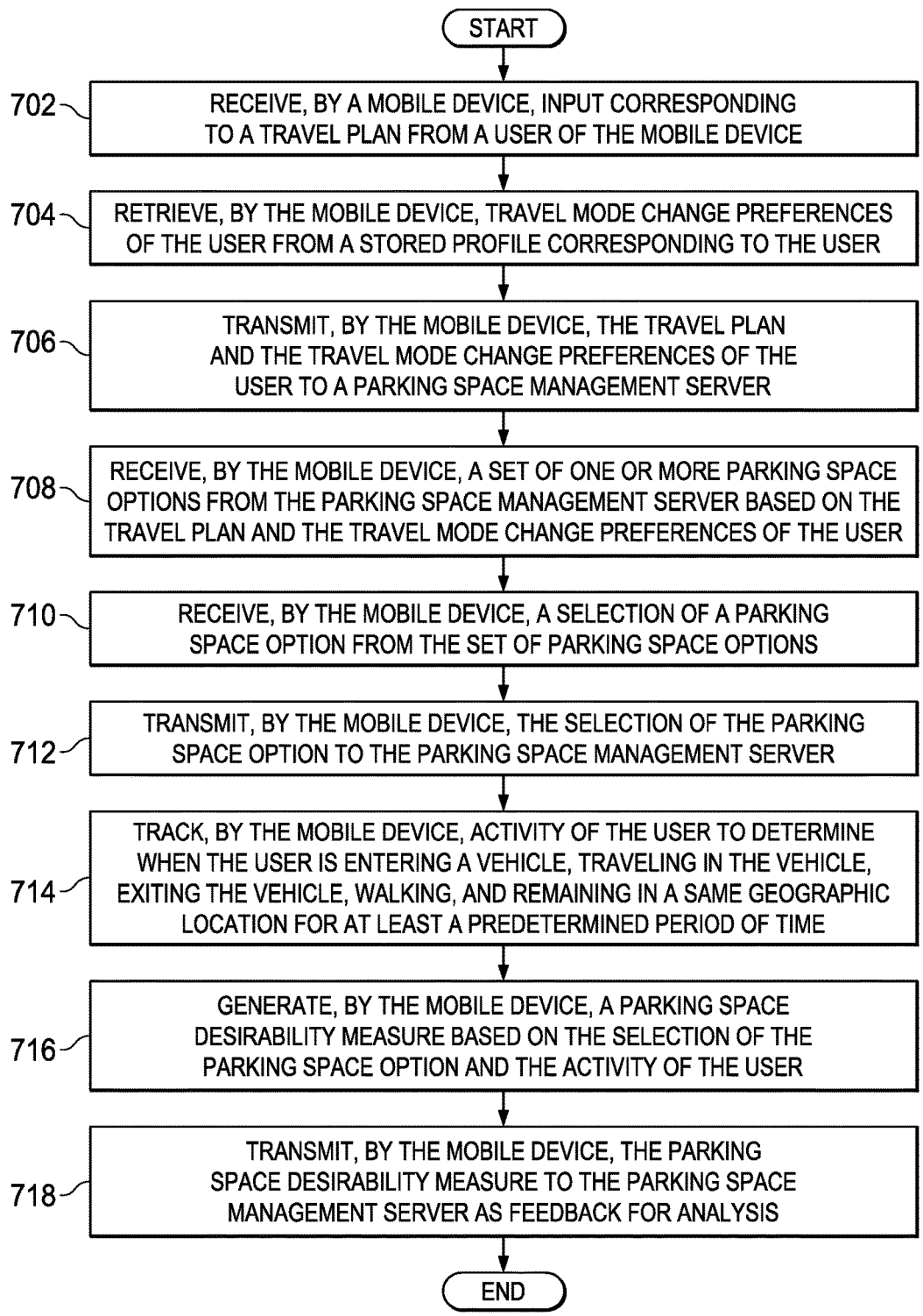
FIG. 7 is a flowchart illustrating a process for generating a parking space desirability measure in accordance with an illustrative embodiment.

With reference now to FIG. 7, a flowchart illustrating a process for generating a parking space desirability measure is shown in accordance with an illustrative embodiment. The process shown in FIG. 7 may be implemented in a mobile client device, such as, for example, client 110 in FIG. 1 or mobile client device 304 in FIG. 3.

The process begins when the mobile device receives input corresponding to a travel plan from a user of the mobile device (step 702). The mobile device retrieves travel mode change preferences of the user from a stored profile corresponding to the user (step 704). Subsequently, the mobile device transmits the travel plan and the travel mode change preferences of the user to a parking space management server (step 706). The parking space management server may be, for example, parking space management server 104 in FIG. 1, data processing system 200 in FIG. 2, or parking space management server 302 in FIG. 3.

Afterward, the mobile device receives a set of one or more parking space options from the parking space management server based on the travel plan and the travel mode change preferences of the user (step 708). Then, the mobile device receives a selection of a parking space option from the set of parking space options (step 710). The mobile device transmits the selection of the parking space option to the parking space management server (step 712).

Furthermore, the mobile device tracks activity of the user to determine when the user is entering a vehicle, traveling in the vehicle, exiting the vehicle, walking, and remaining in a same geographic location for at least a predetermined period of time (step 714). In addition, the mobile device generates a parking space desirability measure based on the selection of the parking space option and the activity of the user (step 716). The mobile device transmits the parking space desirability measure to the parking space management server as feedback for analysis (step 718). Thereafter, the process terminates.

Figure 8:
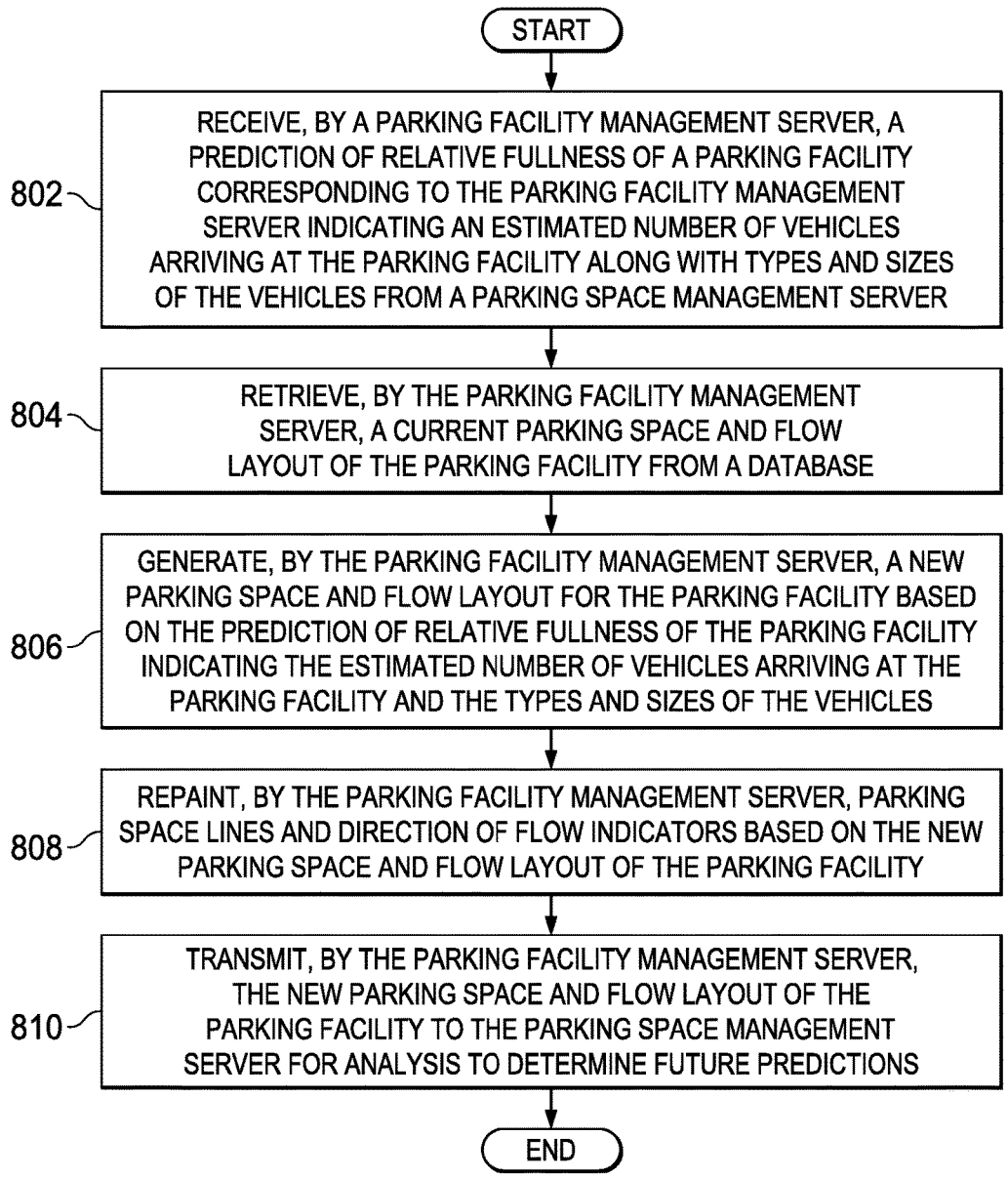
FIG. 8 is a flowchart illustrating a process for repainting parking space lines and direction of flow indicators within a parking facility in accordance with an illustrative embodiment.

With reference now to FIG. 8, a flowchart illustrating a process for repainting parking space lines and direction of flow indicators within a parking facility is shown in accordance with an illustrative embodiment. The process shown in FIG. 8 may be implemented in a computer, such as, for example, parking facility management server 106 in FIG. 1 or parking facility management server 306 in FIG. 3.

The process begins when the parking facility management server receives a prediction of relative fullness of a parking facility corresponding to the parking facility management server indicating an estimated number of vehicles arriving at the parking facility along with types and sizes of the vehicles from a parking space management server (step 802). The parking space management server may be, for example, parking space management server 104 in FIG. 1, data processing system 200 in FIG. 2, or parking space management server 302 in FIG. 3. Afterward, the parking facility management server retrieves a current parking space and flow layout of the parking facility from a database (step 804).

The parking facility management server generates a new parking space and flow layout for the parking facility based on the prediction of relative fullness of the parking facility indicating the estimated number of vehicles arriving at the parking facility and the types and sizes of the vehicles (step 806). The parking facility management server repaints parking space lines and direction of flow indicators based on the new parking space and flow layout of the parking facility (step 808). The parking facility management server may repaint the parking space lines and direction of flow indicators using, for example, light projections or renderings on the ground, walls, or sign posts. In addition, the parking facility management server transmits the new parking space and flow layout of the parking facility to the parking space management server for analysis to determine future predictions (step 810). Thereafter, the process terminates.

Thus, illustrative embodiments of the present invention provide a computer-implemented method, computer system, and computer program product for automatically generating a set of parking space options for a vehicle corresponding to a user based on a final travel destination of the user and a user-desired time of arrival at the final destination during a multi-modal commute. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommending a parking space to a target vehicle, the computer-implemented method comprising:
    receiving, by a computer, current crowdsourced data corresponding to a plurality of vehicles geographically located at a plurality of parking facilities in geographic proximity to an intermediary parking destination of the target vehicle for travel mode change between a starting location and a final destination during a multi-modal commute;
    determining, by the computer, time periods of non-movement for vehicles in the plurality of vehicles and average time period of non-movement by the vehicles in the plurality of parking facilities based on the current crowdsourced data corresponding to the plurality of vehicles;
    determining, by the computer, repetitive overlapping geographic location movement of individual vehicles in the plurality of vehicles within the plurality of parking facilities indicating a lack of available parking spaces based on the current crowdsourced data corresponding to the plurality of vehicles;
    generating, by the computer, a parking space recommendation for the target vehicle at the intermediary parking destination based on parking space availability information that includes the current crowdsourced data corresponding to the plurality of vehicles geographically located at the plurality of parking facilities and based on the time periods of non-movement for vehicles in the plurality of vehicles, average time period of non-movement by the vehicles in the plurality of parking facilities, and the repetitive overlapping geographic location movement of individual vehicles in the plurality of vehicles within the plurality of parking facilities; and
    transmitting, by the computer, the parking space recommendation to a mobile device of a user corresponding to the target vehicle.

2. The computer-implemented method of claim 1 further comprising:
    determining, by the computer, that a number of vehicles of decreased dimensions are arriving at a particular parking facility in the plurality of parking facilities; and
    directing, by the computer, a parking facility management server at the particular parking facility to decrease a size of a number of available parking spaces to accommodate the number of vehicles of decreased dimensions arriving at the particular parking facility increasing a total number of available parking spaces at the particular parking facility.

3. The computer-implemented method of claim 1 further comprising:
    receiving, by the computer, a travel plan that includes a type and a size of the target vehicle utilized by the user, final travel destination of the user, user-desired time of arrival at the final travel destination, and user preferences regarding travel mode changes from the mobile device corresponding to the user; and
    receiving, by the computer, real time crowdsourced navigation data from a plurality of other mobile devices corresponding to other users located at the plurality of parking facilities in geographic proximity to the intermediary parking destination of the target vehicle during the multi-modal commute.

4. The computer-implemented method of claim 3 further comprising:
    generating, by the computer, a prediction of relative fullness of parking facilities in geographic proximity to the intermediary parking destination of the target vehicle at an estimated time of arrival by the target vehicle at each respective parking facility based on an aggregate of parking space desirability measures received from the plurality of other mobile devices.

5. The computer-implemented method of claim 4 further comprising:
    generating, by the computer, a set of one or more parking space options for the target vehicle based on the travel plan, the prediction of relative fullness of the parking facilities in geographic proximity to the intermediary parking destination of the target vehicle during the multi-modal commute, the real time crowdsourced navigation data, local weather forecast data, local event data, local traffic pattern data, local parking cost data, local alternative mode of transportation data, local area safety data, and estimated arrival time by the target vehicle at recommended parking spaces.

6. The computer-implemented method of claim 1 further comprising:
    responsive to the computer determining that the mobile device has arrived at a geographic location corresponding to the parking space recommendation, receiving, by the computer, a parking space desirability measure from the mobile device corresponding to the user; and
    determining, by the computer using a machine learning component, preferences of the user based on the parking space desirability measure received from the mobile device.

7. The computer-implemented method of claim 1, wherein the plurality of parking facilities includes public parking lots, private parking lots, open access parking lots, restricted access parking lots, parking lots that have free parking, parking lots that have paid parking, event parking lots, shopping area parking lots, small business parking lots, large corporation parking lots, parking garages, and on-street parking.

8. The computer-implemented method of claim 1, wherein the generating a parking space recommendation for the target vehicle at the intermediary parking destination further comprises generating the parking space recommendation for the target vehicle at the intermediary parking destination based on a time factorization where a parking lot capacity of the intermediary parking destination depends on a time of day.

9. The computer-implemented method of claim 1, further comprising:
    determining a location security score for the intermediary parking destination based on data corresponding to the intermediary parking destination and a surrounding area, wherein the generating a parking space recommendation for the target vehicle at the intermediary parking destination further comprises generating the parking space recommendation for the target vehicle at the intermediary parking destination based on the location security score.

10. The computer-implemented method of claim 9, wherein the location security score is determined according to at least one of a crime rate at the intermediary parking destination, a description of the intermediary parking destination, a crime rate of the surrounding area, a description of the surrounding area, and a security feature of the intermediary parking destination.

11. A computer system for recommending a parking space to a target vehicle, the computer system comprising:
   a bus system;
   a storage device connected to the bus system, wherein the storage device stores program instructions; and
   a processor connected to the bus system, wherein the processor executes the program instructions to:
   receive current crowdsourced data corresponding to a plurality of vehicles geographically located at a plurality of parking facilities in geographic proximity to an intermediary parking destination of the target vehicle for travel mode change between a starting location and a final destination during a multi-modal commute;
   determine time periods of non-movement for vehicles in the plurality of vehicles and average time period of non-movement by the vehicles in the plurality of parking facilities based on the current crowdsourced data corresponding to the plurality of vehicles;
   determine repetitive overlapping geographic location movement of individual vehicles in the plurality of vehicles within the plurality of parking facilities indicating a lack of available parking spaces based on the current crowdsourced data corresponding to the plurality of vehicles;
   generate a parking space recommendation for the target vehicle at the intermediary parking destination based on parking space availability information that includes the current crowdsourced data corresponding to the plurality of vehicles geographically located at the plurality of parking facilities, based on the time periods of non-movement for vehicles in the plurality of vehicles and average time period of non-movement by the vehicles in the plurality of parking facilities, and based on the repetitive overlapping geographic location movement of individual vehicles in the plurality of vehicles within the plurality of parking facilities; and
   transmit the parking space recommendation to a mobile device of a user corresponding to the target vehicle.

12. The computer system of claim 11, wherein the processor further executes the program instructions to:
   determine that a number of vehicles of decreased dimensions are arriving at a particular parking facility in the plurality of parking facilities; and
   direct a parking facility management server at the particular parking facility to decrease a size of a number of available parking spaces to accommodate the number of vehicles of decreased dimensions arriving at the particular parking facility increasing a total number of available parking spaces at the particular parking facility.

13. The computer system of claim 11, wherein the processor further executes the program instructions to:
   receive a travel plan that includes a type and a size of the target vehicle utilized by the user, final travel destination of the user, user-desired time of arrival at the final travel destination, and user preferences regarding travel mode changes from the mobile device corresponding to the user; and
   receive real time crowdsourced navigation data from a plurality of other mobile devices corresponding to other users located at the plurality of parking facilities in geographic proximity to the intermediary parking destination of the target vehicle during the multi-modal commute.

14. The computer system of claim 13, wherein the processor further executes the program instructions to:
   generate a prediction of relative fullness of parking facilities in geographic proximity to the intermediary parking destination of the target vehicle at an estimated time of arrival by the target vehicle at each respective parking facility based on an aggregate of parking space desirability measures received from the plurality of other mobile devices.

15. A computer program product for recommending a parking space to a target vehicle, the computer program product comprising a computer readable storage medium having program instructions embodied therewith, the program instructions executable by a computer to cause the computer to perform a method comprising:
   receiving, by the computer, current crowdsourced data corresponding to a plurality of vehicles geographically located at a plurality of parking facilities in geographic proximity to an intermediary parking destination of the target vehicle for travel mode change between a starting location and a final destination during a multi-modal commute;
   determining, by the computer, time periods of non-movement for vehicles in the plurality of vehicles and average time period of non-movement by the vehicles in the plurality of parking facilities based on the current crowdsourced data corresponding to the plurality of vehicles;
   determining, by the computer, repetitive overlapping geographic location movement of individual vehicles in the plurality of vehicles within the plurality of parking facilities indicating a lack of available parking spaces based on the current crowdsourced data corresponding to the plurality of vehicles;
   generating, by the computer, a parking space recommendation for the target vehicle at the intermediary parking destination based on parking space availability information that includes the current crowdsourced data corresponding to the plurality of vehicles geographically located at the plurality of parking facilities and based on the time periods of non-movement for vehicles in the plurality of vehicles, average time period of non-movement by the vehicles in the plurality of parking facilities, and the repetitive overlapping geographic location movement of individual vehicles in the plurality of vehicles within the plurality of parking facilities; and
   transmitting, by the computer, the parking space recommendation to a mobile device of a user corresponding to the target vehicle.

16. The computer program product of claim 15 further comprising:
   determining, by the computer, that a number of vehicles of decreased dimensions are arriving at a particular parking facility in the plurality of parking facilities; and
   directing, by the computer, a parking facility management server at the particular parking facility to decrease a size of a number of available parking spaces to accommodate the number of vehicles of decreased dimensions arriving at the particular parking facility increasing a total number of available parking spaces at the particular parking facility.

17. The computer program product of claim 15 further comprising:

receiving, by the computer, a travel plan that includes a type and a size of the target vehicle utilized by the user, final travel destination of the user, user-desired time of arrival at the final travel destination, and user preferences regarding travel mode changes from the mobile device corresponding to the user; and receiving, by the computer, real time crowdsourced navigation data from a plurality of other mobile devices corresponding to other users located at the plurality of parking facilities in geographic proximity to the intermediary parking destination of the target vehicle during the multi-modal commute.

18. The computer program product of claim 17 further comprising:

generating, by the computer, a prediction of relative fullness of parking facilities in geographic proximity to the intermediary parking destination of the target vehicle at an estimated time of arrival by the target vehicle at each respective parking facility based on an aggregate of parking space desirability measures received from the plurality of other mobile devices.

19. The computer program product of claim 18 further comprising:

generating, by the computer, a set of one or more parking space options for the target vehicle based on the travel plan, the prediction of relative fullness of the parking facilities in geographic proximity to the intermediary parking destination of the target vehicle during the multi-modal commute, the real time crowdsourced navigation data, local weather forecast data, local event data, local traffic pattern data, local parking cost data, local alternative mode of transportation data, local area safety data, and estimated arrival time by the target vehicle at recommended parking spaces.

20. The computer program product of claim 15 further comprising:

responsive to the computer determining that the mobile device has arrived at a geographic location corresponding to the parking space recommendation, receiving, by the computer, a parking space desirability measure from the mobile device corresponding to the user; and determining, by the computer using a machine learning component, preferences of the user based on the parking space desirability measure received from the mobile device.

\* \* \* \* \*